United States Patent
Roantree (10) Patent No.: US 7,990,559 B2
(45) Date of Patent: Aug. 2, 2011

(54) COMMUNICATION NETWORK DIAGNOSTIC REPORT

(75) Inventor: Martin Roantree, Herts (GB)

(73) Assignee: Xerox Corporation, Norwalk, CT (US)

( * ) Notice: Subject to any disclaimer, the term of this patent is extended or adjusted under 35 U.S.C. 154(b) by 1167 days.

(21) Appl. No.: 11/723,847

(22) Filed: Mar. 22, 2007

(65) Prior Publication Data

US 2008/0273219 A1     Nov. 6, 2008

(51) Int. Cl.
*G06F 3/12* (2006.01)
(52) U.S. Cl. ....... 358/1.15; 358/400; 358/405; 358/406; 358/434; 358/435
(58) Field of Classification Search ................... None
See application file for complete search history.

(56) References Cited

U.S. PATENT DOCUMENTS

| | | | | |
|---|---|---|---|---|
| 5,351,134 A * | 9/1994 | Yaguchi et al. | ............. | 358/435 |
| 5,517,324 A * | 5/1996 | Fite et al. | ............. | 358/434 |
| 5,566,003 A * | 10/1996 | Hara et al. | ............. | 358/448 |
| 5,757,514 A * | 5/1998 | Shibata et al. | ............. | 358/434 |
| 5,959,741 A * | 9/1999 | Yoshida et al. | ............. | 358/440 |
| 6,598,183 B1 * | 7/2003 | Grieco et al. | ............. | 714/43 |
| 6,816,911 B1 * | 11/2004 | Toyoda et al. | ............. | 709/238 |
| 6,882,438 B1 * | 4/2005 | Kanaya | ............. | 358/1.15 |
| 7,151,614 B1 * | 12/2006 | Umansky et al. | ............. | 358/1.15 |
| 7,155,538 B1 * | 12/2006 | Rossello et al. | ............. | 709/249 |
| 7,199,906 B1 * | 4/2007 | Tamura | ............. | 358/400 |
| 7,668,953 B1 * | 2/2010 | Sinclair et al. | ............. | 709/224 |
| 7,761,752 B2 * | 7/2010 | Imai et al. | ............. | 714/708 |
| 2004/0042467 A1 * | 3/2004 | Abrishami et al. | ............. | 370/401 |
| 2005/0190404 A1 * | 9/2005 | Nakamura | ............. | 358/1.15 |

* cited by examiner

*Primary Examiner* — Chan S Park
*Assistant Examiner* — Dung D Tran
(74) *Attorney, Agent, or Firm* — Pillsbury Winthrop Shaw Pittman LLP (57) ABSTRACT

A method of analyzing the quality of a communication network for facsimile devices, wherein the communication network comprises at least a first facsimile device communicating through a digital network and a second facsimile device communicating through an analog network. The method comprises establishing a connection between the facsimile devices using the communication network, assessing a configuration of the connection between the facsimile devices, identifying at least one problem in the connection between the facsimile devices, and generating a network diagnostic report of the at least one identified problem. A network diagnostic report may be delivered to a user interface. Bits of the facsimile information fields (FIF) of the digital identification signal (DIS) and non-standard facilities (NSF) signal of the second facsimile device are compared to analyze problems with the communication network.

18 Claims, 4 Drawing Sheets

NETWORK QUALITY REPORT

⦿ FAX ERROR CORRECT MODE HAS BEEN DISABLED BY THE NETWORK AND MAY LEAD TO POOR IMAGE QUALITY. PLEASE REQUEST IM ADMINISTRATOR TO CONFIGURE NETWORK CORRECTLY TO ENABLE FAX ERROR CORRECT MODE.

⦿ FAX MODULATION RATE HAS BEEN REDUCED BY THE NETWORK AND FAX TRANSMISSION TIMES MAY BE LONGER THAN NECESSARY. PLEASE CONSIDER USING EXTERNAL TELEPHONE LINE OR REQUEST IM ADMINISTRATOR CONFIGURE NETWORK CORRECTLY FOR HIGHER-SPEED FAX TRANSMISSION.

○ FAX SIGNAL ATTENUATION = xxdB
THIS MAY LEAD TO TRANSMISSION TIMES BEING LONGER THAN NECESSARY. PLEASE REQUEST NETWORK SERVICE PROVIDER TO CHECK QUALITY OF LINE OR CONSIDER INCREASING TRANSMIT SIGNAL LEVEL.

*FIG. 5*

COMMUNICATION NETWORK DIAGNOSTIC REPORT

FIELD

The present application is generally related to systems and methods for diagnosing the suitability of a communication network to transmit a facsimile between two facsimile devices. More specifically, the present application discloses a communication network diagnostic report that is generated for identifying problems with the communication network connection between a sending facsimile device and a receiving facsimile device, and methods for optimizing the connection for sending facsimile images.

BACKGROUND

Facsimile terminals, or "fax machines," are widely used in home and office environments. A fax machine typically has the following basic components: (1) a processor for managing the transmission and receipt of faxed documents, (2) a scanner for scanning a document and converting it to a digital image file, (3) a printer for printing a received image file as a document, and (4) a user interface for enabling the user to operate the device and input data, such as from send destinations.

Group 3 (G3) fax technology is currently the most widely used type of facsimile transmission. G3 technology uses methods that combine amplitude and phase modulation of an analog signal generated by modems to communicate over analog telephone lines. Typically data is compressed and run-length encoding is used to result in a transmission time of less than one minute per page. Group 3 specifications are formed by the International Telecommunication Union (ITU). The ITU identifies the standards, characteristics, and operation for facsimile devices of Group 3 digital transmission. G3 standards are identified in the ITU-T Recommendations T.30 and T.4, which are incorporated herein in their entirety.

The T.4 Recommendation is the G3 standard which specifies how image data is to be formatted for facsimile transmission and reception. The T.30 Recommendation defines a binary coded system for the data transmission procedures which are necessary for document transmission between two facsimile terminals in the public switched telephone network (PSTN). As customers are migrating to using PSTN with broadband technology networks or Internet Protocol (IP) networks for data transmission, the performance of the fax machines may be limited by the communication network. For some facsimile machines, IP or broadband networks are either poorly configured or not supported for fax transmission, thus a fax may be degraded or not sent or received. Also problematic with sending faxes over IP or broadband networks is the modification of digital signals by the communication network. The signal bits may be modified during transmission, thus limiting capabilities of the fax machines. For example, error correct mode (ECM) allows a fax machine to correct errors caused by noise in a PSTN. ECM is enabled using the signal bits. If ECM is defined as being enabled by a bit value set to "1", and the bit value is modified or converted to "0" by the communication network, ECM will be disabled. Thus, noise cannot be corrected, and the faxes may have poor image quality. Other problems with the transmission include reduced transmission rate due to voice or audio compression. Another problem found in analog networks, supporting broadband, includes increased attenuation of the signals.

With problems such as those identified above, and the increasing popularity of IP and broadband networks, problems in fax image transmission may increase. The present application therefore provides one or more embodiments for diagnosing a communication network between faxes using an IP or broadband network, identifying the problems in the network, and aiding to correct the problems.

SUMMARY

One embodiment provides a method of analyzing the quality of a communication network for facsimile devices, the communication network comprising at least a first facsimile device communicating through a digital network and a second facsimile device communicating through an analog network, the method comprising: establishing a connection between the facsimile devices using the communication network; assessing a configuration of the connection between the facsimile devices; identifying at least one problem in the connection between the facsimile devices; and generating a network diagnostic report of the at least one identified problem. The method may further comprise delivering the network diagnostic report. The network diagnostic report may be delivered to a user interface, and may identify one or more improvements or solutions for correcting the at least one problem identified in the network connection.

Further, in an embodiment, the method may comprise assessing the configuration of the network comprises comparing bits of the facsimile information field (FIF) of the digital identification signal (DIS) from the second facsimile device to corresponding bits of the facsimile information field (FIF) of the non-standard facilities (NSF) signal from the second facsimile device to identify any changes made to the bits of the FIF of the DIS signal by communicating through the communication network.

In one embodiment, the identified problems comprise one or more of the following: disabling error correct mode, "noise" on the network, reducing facsimile modulation data rate due to voice codec compression, reduced signal attenuation due to the presence of DSL microfilters, or a poor terminal connection. In one embodiment, the improvements include increasing the signal level of the facsimile, increasing the gain of the network, enabling error correct mode, switching to an analog network, or configuring the network.

Another embodiment provides a system for analyzing and diagnosing a communication network connection for facsimile transmission, comprising a first facsimile device for sending facsimile information; a second facsimile device for receiving the facsimile information from the first facsimile device; the first facsimile device and second facsimile device connected through a communication network such that the first and second facsimile devices communicate with each other to send and receive the facsimile information, and wherein the first facsimile device receives information to identify one or more problems within the communication network to generate a network diagnostic report of the at least one identified problems in the communication network.

The system may comprise a user interface for activating analysis of the configuration of the communication network. In one embodiment, the user interface comprises a display of the network diagnostic report delivered to the user interface. In one embodiment, the network diagnostic report further includes improvements for correcting the at least one identified problems.

Further, in an embodiment, the system may include the first facsimile device assessing the configuration of the network by comparing bits of the facsimile information field (FIF) of the digital identification signal (DIS) of the second facsimile device to corresponding bits of the facsimile information field (FIF) of the non-standard facilities (NSF) signal from the second facsimile device, and identifying changes made to the bits of the FIF of the DIS signal by the communication network.

In an embodiment, the identified problems comprise one or more of the following: disabling error correct mode, "noise" on the network, reducing facsimile modulation data rate due to voice codec compression, reduced signal attenuation due to the presence of DSL microfilters, or a poor terminal connection. In one embodiment, the improvements include increasing the signal level of the facsimile, increasing the gain of the network, enabling error correct mode, switching to an analog network, or configuring the network.

The communication network of the system may comprise in an embodiment analog and digital networks for sending and receiving facsimile information. In an embodiment, the first facsimile device communicates through a digital network. In another embodiment, the second facsimile device communicates through an analog network.

Another embodiment provides a method of analyzing the quality of a communication network for facsimile devices, the communication network comprising at least a first facsimile device communicating through a digital network and a second facsimile device communicating through an analog network, the method comprising: the second facsimile device sending bits of a facsimile information field (FIF) of a non-standard facilities (NSF) signal to the first facsimile device; the first facsimile device determining if all of the bits are equal to zero, and if all bits are equal to zero, then identifying a disability to analyze the quality of the communication network, and generating a network diagnostic report of the disability. Otherwise, the method comprises assessing a configuration of the connection between the facsimile devices; identifying at least one problem in the connection between the facsimile devices; and generating a network diagnostic report of the at least one identified problem.

In an embodiment, assessing the configuration of the network comprises comparing bits of the facsimile information field (FIF) of the digital identification signal (DIS) from the second facsimile device to corresponding bits of the facsimile information field (FIF) of the non-standard facilities (NSF) signal from the second facsimile device to identify any changes made to the bits of the FIF of the DIS signal by communicating through the communication network. In an embodiment, the method further comprises delivering the network diagnostic report, the diagnostic report identify at least one improvement for correcting the at least one identified problems.

Other objects, features, and advantages of the present application will become apparent from the following detailed description, the accompanying drawings, and the appended claims.

DETAILED DESCRIPTION OF THE ILLUSTRATED EMBODIMENT(S)

Figure 1:
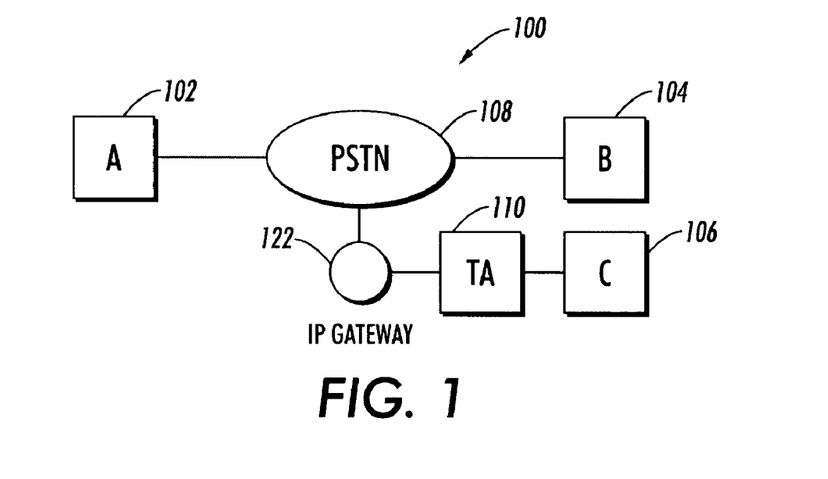
FIG. 1 is a schematic diagram for facsimile devices communicating through networks to electronically transmit a fax in accordance with an embodiment.

FIG. 1 is a schematic diagram for facsimile devices communicating through a communication network 100 to electronically transmit a fax(es) in accordance with an embodiment. Shown are three facsimile devices, product "A," "B," and "C." Products A, B, and C are facsimile devices noted as 102, 104, and 106 (respectively), designed to communicate with each other and to send and receive faxes through the communication network 100 which comprises a plurality of analog or digital networks. Facsimile devices 102, 104, and 106 are in different locations. The fax device 102 and fax device 104 use an analog public switched telephone network (PSTN) 108 to communicate with each other. Fax device 106 is connected to and communicates with fax devices 102 and 104 through a digital network 122. As shown in FIG. 1, the digital network 122 may be an IP network with IP Gateway. The digital network 122 may also be a Voice Over IP, PSTN with broadband, or WiFi network. The fax device 106 uses an IP terminal adapter "TA," noted as 110, to communicate through digital network 122.

Fax device 106 may be used as a sending fax device for sending fax information (i.e., a scanned image file), for example. Fax devices 102 or 104 may be remote or receiving facsimile devices for receiving the facsimile information from the sending fax device 106. For explanatory purposes only, the figures will be described herein with reference to the communication between sending fax device 106 and receiving fax device 102. The sending fax device 106 and receiving fax device 102 are connected through the digital network 122 to communicate with each other, i.e., to send and receive facsimile information. When communicating through digital network 122 (e.g., such as IP networks or PSTN with broadband networks), poor image quality and long transmission times may result due to network configuration problems. To solve the problems associated with the digital network 122 and to allow for successful communication between fax devices 102 and 106 using the digital network 122, sending fax device 106 is enabled to receive information from the receiving fax device 102 to identify problems in the network connection.

Figure 2:
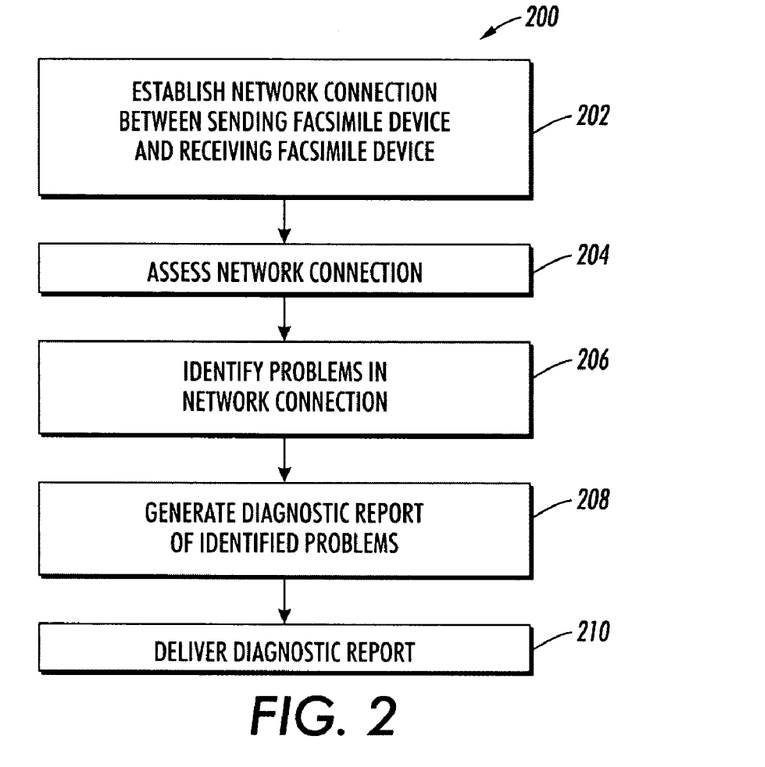
FIG. 2 shows an embodiment of a method for diagnosing the suitability of a communication network to send a fax.

FIG. 2 shows an embodiment of a method for analyzing the configuration of a communication network connection between two fax devices. First, a communication network connection is established 202 between the sending fax device 106 and the receiving fax device 102. Once the connection is acknowledged, the network connection is assessed 204, and problems are identified 206. Once problems are identified 206, the sending facsimile device 106 generates a diagnostic report 208 of the identified problems in the communication network. The diagnostic report is then delivered 210. The diagnostic report may be delivered to the sending fax device 106, such as in a printout, or delivered to a user interface.

The diagnostic report includes at least one identified problem(s) in the communication network 100 between fax device 102 and fax device 106; for example, a problem may be established while using PSTN 108 and IP Gateway 122 to communicate between the fax devices. An example of an identified problem may include that the receiving fax device 102 does not support the diagnostic report feature. Other problems that may be identified include, but are not limited to, the disablement of error correct mode (ECM) when the analog signals are sent across the digital network 122, "noise" on the PSTN 108, or reduction of the facsimile modulation data rate (e.g., due to voice codec compression). In a communication network 100 comprising a PSTN with broadband connection as the digital network 122, a user may have DSL micro filters connected to the line. DSL micro filters are used to block signals above a certain frequency on a PSTN (i.e. voice) line. For example, voice conversations typically take place below 4 KHz, therefore the micro filters are built to block everything above 4 KHz to prevent the DSL signals from interfering with standard telephone calls. The filters may also be used to reduce noise on the transmission line. The existence of DSL micro filters may also be a problem noted on the diagnostic report.

The diagnostic report allows a user to not only identify the problems, but may additionally include identifying improvements or solutions for correcting those problems to allow the user to improve the configuration of the communication network or the communication network connection. Improvements may include increasing the signal level of a facsimile device, or changing the network or product configuration. For example, when it is determined that ECM has been disabled or that the modulation data rate is low, the communication network may need to be configured to enable ECM or provide higher speed transmission, using appropriate fax relay or fax passthrough configuration settings. Further description of the diagnostic report is provided with reference to FIGS. 4 and 5 below.

In one embodiment, the method of assessing, identifying, and reporting the configuration or diagnostics of a communication network connection is performed by comparing the signals of the sending fax device 106 and the receiving fax device 102. As previously noted, the T.30 Recommendation defines a binary coded system for the data transmission procedures which are necessary for document transmission between two facsimile terminals in the public switched telephone network (PSTN). The binary coded system is used whenever a new transmission of information begins in any direction, and contains specific bit information for the control and message interchange between two facsimile terminals. The binary coded system is based on a High Level Data Link Control (HDLC) format or frame structure. The basic HDLC structure consists of a number of frames, each of which is subdivided into a number of information fields (e.g., the Facsimile Control Field, FCF, and Facsimile Information Field, FIF, as will be further described below). These information fields provide, for example, confirmation of correctly received information, error checking/correcting, or the capability of modem modulation.

Figure 3:
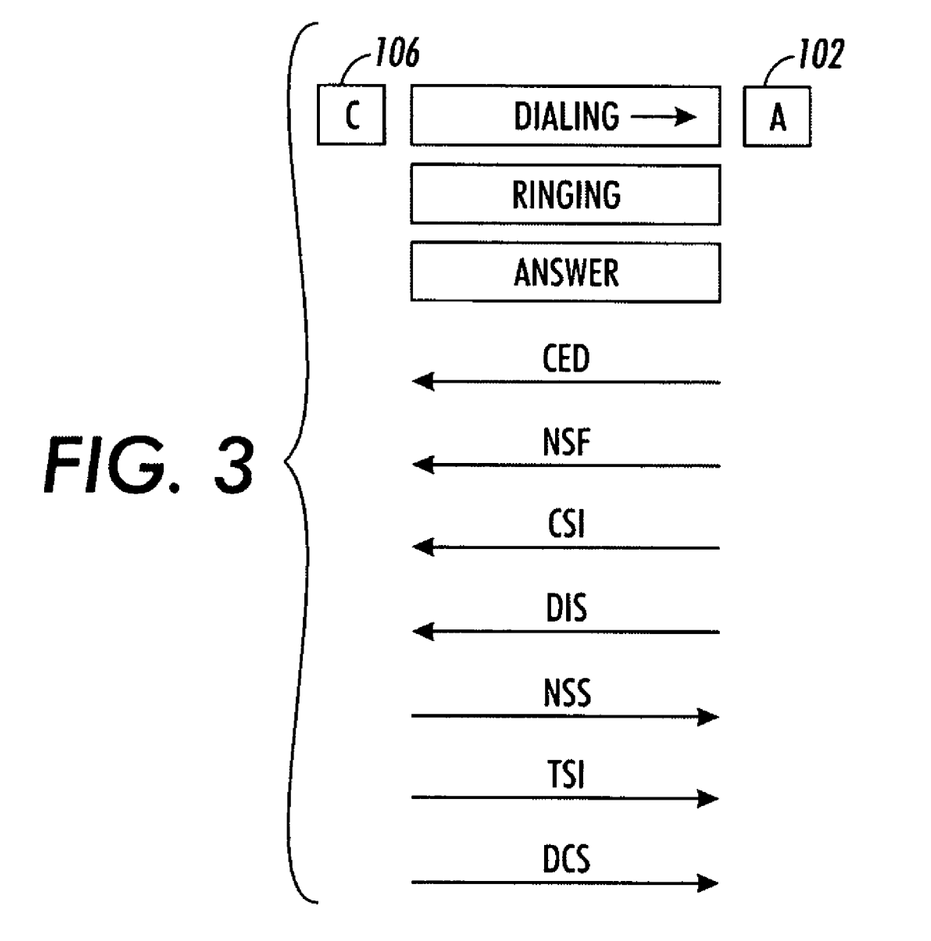
FIG. 3 shows a fax protocol, according to T.30 recommendations, for a sending facsimile device and a receiving facsimile device communicating through a network, in accordance with an embodiment.

FIG. 3 shows a fax protocol, according to T.30 Recommendations, for a sending facsimile device and a receiving facsimile device communicating through a communication network 100, in accordance with an embodiment. In the T.30 Recommendation, protocol is divided into two parts, the Facsimile Control Field (FCF) and the Facsimile Information Field (FIF). The Facsimile Control Field FCF is defined to be the first few bits (e.g., using 8-bit bytes or octets) of the HDLC information field. The Facsimile Control Field FCF contains the complete information regarding the type of information being exchanged, and the position in the overall sequence. The FCF includes bit assignments that are transferred using information signals between a sending fax and a receiving fax. The following are terms and definitions of information signals known in the art as defined by the ITU T.30 Recommendation:

Digital Identification Signal (DIS)—a signal that characterizes the standard ITU-T capabilities of the receiving fax (or called terminal);

Called Subscriber Identification (CSI)—a signal used to provide the specific identity of the receiving fax (e.g., the called fax number);

Non Standard Facilities (NSF)—a signal used to identify specific user requirements (e.g., manufacturers country and make of the fax device) which are not covered by the T-series Recommendations;

Called Equipment Identification (CED)—also defined as the called station or called terminal identification signal; an answer signal that is transmitted from the receiving fax to the sending fax (e.g., a 2100 Hz tone);

Digital Command Signal (DCS)—a signal that is the digital set-up command responding to the standard capabilities identified by the DIS signal; indicates the bit rate of the training signal to follow;

Transmitting Subscriber Information (TSI)—a signal that indicates that the following FIF information is the identification of the transmitting terminal (e.g., the telephone number of the sending fax); may be used to provided additional security to the facsimile procedures; and Non Standard facilities Setup (NSS)—a signal that is the digital command response to the information contained in the NSF signal; allows the use of special proprietary functions.

The Facsimile Information Field FIF follows the Facsimile Control Field FCF, and provides additional information (e.g., additional 8-bit octets) to further clarify the facsimile procedure. The Facsimile Information Field FIF information also consists of information in the DIS, CSI, TSI, NSF, etc. signals. The sending fax 106 and receiving fax 102 use these information signals to communicate with each other, as shown in FIG. 3.

The features available on a remote fax device, such as error correct mode and modem modulation capability, are carried in the bits of the Digital Identification Signal (DIS) of the Facsimile Information Field (FIF) according to the ITU Recommendation T.30. The error correct mode (ECM) is used in G3 fax machines to automatically detect and correct errors caused by the noise in PSTNs. The modem modulation process involves the conversion of the digital computer signals to analog tones. The ECM mode is controlled by bit 27 of the Facsimile Information Field FIF, and the modem modulation capability is controlled by bit 6 and bits 11 to 14 of the Facsimile Information Field FIF. These bits are well defined but may be modified, (e.g., when passing through a router not optimized for fax transmission), so the sending fax assumes that the receiving fax has a limited feature capability such as being unable to support ECM or reducing the modulation data rate. The performance of the fax communication is therefore reduced and may be less than optimum.

The sending facsimile device 106 is designed to use the T.30 protocol to diagnose the suitability of the communication network 100 to send fax images from sending fax 106 to the receiving fax 102 by comparing the bits between the Facsimile Information Fields (FIFs) of the Digital Identification Signal (DIS) and Non Standard Facilities (NSF). One benefit of using the Non Standard Facilities (NSF) signal is that the bits of the Non Standard Facilities (NSF) signal are proprietary and are not normally changed by the communication network. Thus, during transmission of the signals across the digital network 122, the bits of the NSF will not normally be modified or changed. By comparing the bits of the Digital Identification Signal (DIS) and the bits of the Non Standard Facilities (NSF), (i.e., comparing the changes in the bits between the two information fields, FIFs), the sending fax 106 may determine if any of the features of the receiving fax 102 have been changed by the digital network 122. That is, the sending fax 106 may determine if any of the bits of the DIS have been modified (e.g., such as changing a bit value from "1" to "0"). If so, a diagnostic report is generated.

The bytes or octets of the FIF of the DIS signal are predefined using the ITU-T.30 Recommendation. The FIF contain a list of the configuration settings of the receiving fax device 102. For example, the modem modulation capabilities are defined by bits 6 and 11 to 14. Bit 6 defines the V.8 capabilities of a fax device, and bits 11 through 14 define the data signaling rate. Bit 27 defines the error correct mode (ECM). The initial bytes (or octets) of the FIF of the NSF signal are defined by ITU standard T.35 and include the manufacturer's country code and the manufacturer's code (as shown in an embodiment below). Other bits are available for use by the manufacturer as required.

The reference chart below is an exemplary embodiment of the FIF of the NSF signal, e.g., the configuration settings for the receiving fax device 102. The chart illustrates how the octets of bits may be assigned. As shown, octets 1 through 10 have a predefined configuration. However, the octets may be alternatively reassigned and specified by the manufacturer. Thus, the configurations or assignment of the bits should not be limited to the embodiment shown below.

| Octet | NSF |
| --- | --- |
| 1 | Country code as defined by T.35 |
| 2 | Terminal provider code as defined by T.35 |
| 3 | Terminal provider code as defined by T.35 |
| 4 | Terminal provider code as defined by T.35 |
| 5 | Reserved (may be used to send modem TX signal level) |
| 6 | Octet 1 of DIS |
| 7 | Octet 2 of DIS |
| 8 | Octet 3 of DIS |
| 9 | Octet 4 of DIS |
| 10 | Octet 5 of DIS |
| 11 | Octet 6 of DIS if required |
| 12 | Octet 7 of DIS if required |
| 13 | Octet 8 of DIS if required |
| 14 | Octet 9 of DIS if required |
| 15 | Octet 10 of DIS if required |
| 16 | Octet 11 of DIS if required |
| 17 | Octet 12 of DIS if required |
| 18 | Octet 13 of DIS if required |
| 19 | Octet 14 of DIS if required |

As noted above, by comparing the bits of the octets in the DIS and the bits of the octets in the NSF, problems may be identified in the communication network and a diagnostic report may be generated. For example, in one embodiment, bit comparison may include the DIS signal of the receiving fax 102 having the following default values: bit 6 set to 0 (V8 disabled), bits 11 to 14 set to 1101 (representing V17 modulation and 14400 b/S), and bit 27 set to 1 (ECM enabled). If the IP terminal adapter 110 of FIG. 1 is not configured to support error correct mode (ECM) or V17 modem modulation, it will change the FIF of the DIS when transmitting through the digital network 122. For example, the IP terminal adapter 110 may modify or change the value of bits 11 to 14 to 1100 (representing V29 and 7200 b/S), and the value of bit 27 modified to 0 (ECM disabled). By comparing the bits of the NSF (i.e., set at the default values) to the modified bits 11 to 14 and 27 of the DIS, the sending fax device 106 determines there are problems in the communication network 100 and generates a diagnostic report. As another example of bit comparison, in an embodiment, the bits may be compared to determine if the diagnostic report feature is feasible or if it is supported.

As another example, when digital network 122 is a PSTN with broadband, the sending fax device's 106 modem determines or measures the signal level of the transmission signals received from the receiving fax device 102, or the "RX" signal. The "TX" signal is the signal level of the transmission signals at the receiving device 102 (i.e. the signal level at which the receiving device 102 is set). Using the "RX" and "TX" signals, the signal attenuation across the PSTN with broadband network may be determined, such as by comparing the RX signal to the TX signal level contained in the bits of octet 5 of the NSF.

Figure 4:
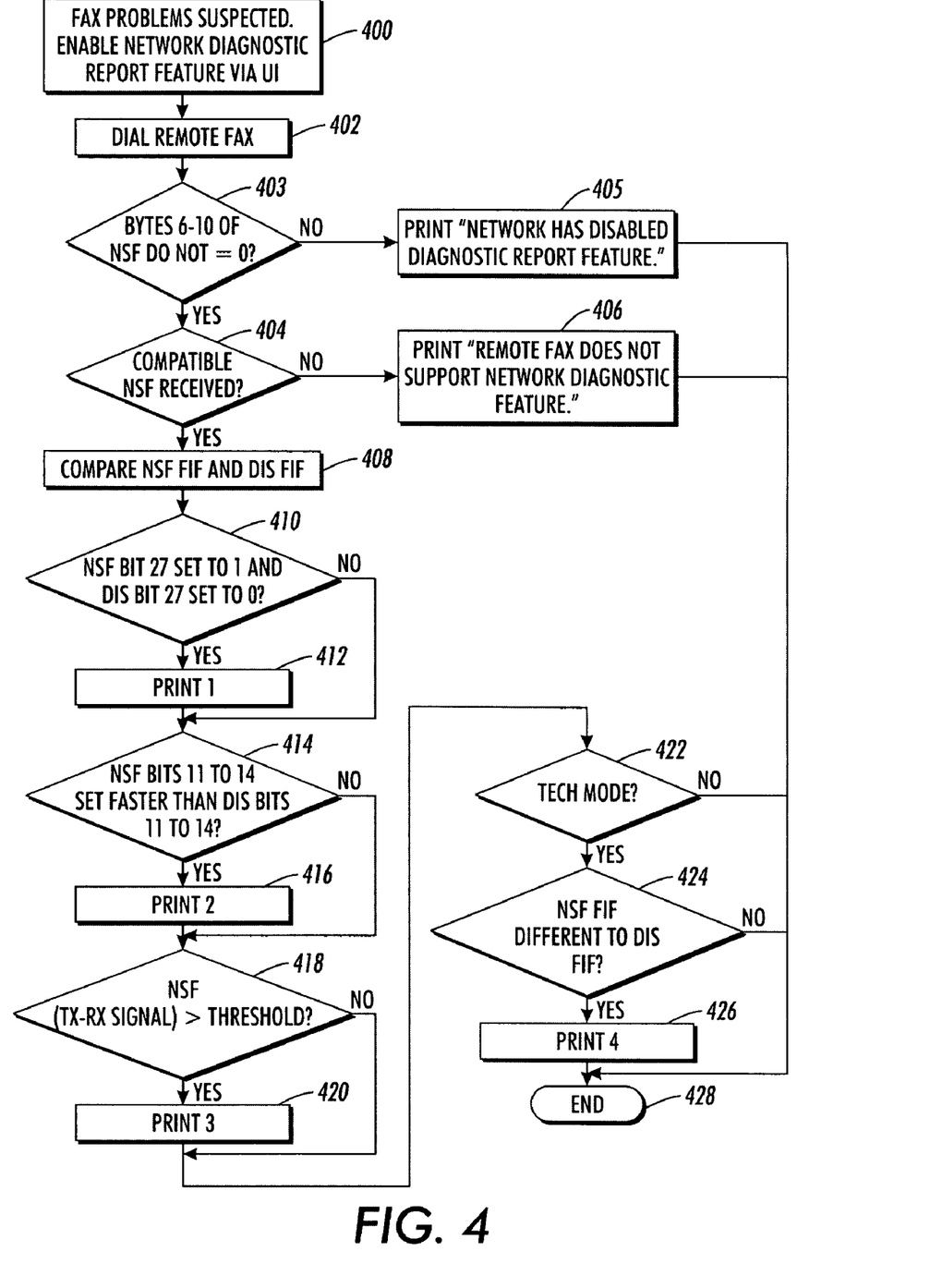
FIG. 4 shows an embodiment of a method for identifying problems within a communication network connection.

FIG. 4 shows an embodiment of a method for identifying and delivering notification of a problem(s) within a communication network. Specifically, FIG. 4 shows how bits are modified and compared, and the delivery of a diagnostic report. First, a fax problem is suspected and a user interface (UI) is used to enable the network diagnostic report feature 400 for the communication network. The sending fax device then dials 402 the receiving or remote fax device. The NSF is received from the receiving fax device. The octets of the NSF are then read to determine if the communication network has overwritten the bits in the octets. For example, during transfer of the bit information, the digital network may overwrite the FIF of the NSF using a string of zeroes, such that the receiving fax can not read the NSF signal and thus set up a communication mode that the communication network may not support. Therefore, the octets or bytes of the NSF are read and determined if bytes 6-10 are equal to zero 403. If yes, a diagnostic report is generated and delivered 405 by printing "Network has disabled diagnostic report feature." If bytes 6-10 of the NSF do not equal zero, it is determined if the receiving fax is compatible using NSF 404. If it is not compatible, a network quality report is generated and delivered by printing 406 "Remote fax does not support network diagnostic report feature."

If the NSF of the receiving fax device is compatible, the FIF of the NSF and FIF of the DIS are compared 408. To determine if error correct mode has been disabled, it is determined 410 if bit 27 of the NSF is set to a value of "1" and if bit 27 of the DIS is set to "0." If the answer is yes, the problem "Print 1" is added 412 to the diagnostic report. If the answer is no, bits 11 to 14 of the NSF are compared to bits 11 to 14 of the DIS FIF to determine 414 if the bits of NSF are set at a faster data rate. If the answer is yes, the problem "Print 2" is added 416 to the diagnostic report. If the answer is no, the NSF TX and RX signals are compared 418 to a threshold. As defined above, "TX" represents the set signal level of the transmission signals of receiving fax device 102. "RX" represents the signal level of the transmission signals from the receiving fax device 102 as measured by the sending fax device 106. The threshold is preferably a preset value that defines the maximum acceptable attenuation for the fax signal. In one embodiment, the threshold may be 30 dB. If the attenuation signal is greater than the threshold, the problem "Print 3" is added 420 to the diagnostic report. If the answer is no, the sending fax device 106 is analyzed to determine if it is in "Tech" mode 422. For example, a fax device may be configured to have different modes of operation, such as: User (normal), System Administrator, or Service or Tech mode. The service or "Tech" mode allows for in-depth diagnostics to be performed by a service engineer or technician. If the answer is yes (i.e., the fax device is in "Tech" mode), the FIF of the NSF is then compared 424 to the FIF of the DIS to determine if they are different (i.e., the value of the bits are compared). If the answer is yes, the problem "Print 4" is added 426 to the diagnostic report. If the fax device is not in Tech mode or if the NSF of the FIF and DIS of the FIF are not different, the method of analyzing the communication network connection ends 428 and the diagnostic report is printed.

The noted problems above (i.e., Print 1 through Print 4) identify specific problems and improvements to be generated and delivered on the diagnostic report for the communication network. For example, they may be defined as:

Print 1—Fax "Error Correct Mode" has been disabled by the network and may lead to poor image quality. Please request service provider or IM administrator to configure the communication network to enable error correct mode.

Print 2—Fax modulation rate has been reduced by the network and fax transmission times may be longer than necessary. Please consider using a PSTN or request service provider or IM administrator to configure communication network for higher speed transmission.

Print 3—Fax signal attenuation="x" dBm. This may lead to transmission times being longer than necessary. Please request network service provider or IM administrator to check the line connections or increase gain of the communication network.

Print 4 (Tech mode only)—The network has changed FIF of the DIS bits x, y, z (i.e., the values of the bits have been changed or altered). This may lead to non-optimum fax performance. Please consider using a PSTN or request service provider or IM personnel to configure the communication network appropriately.

Figure 5:
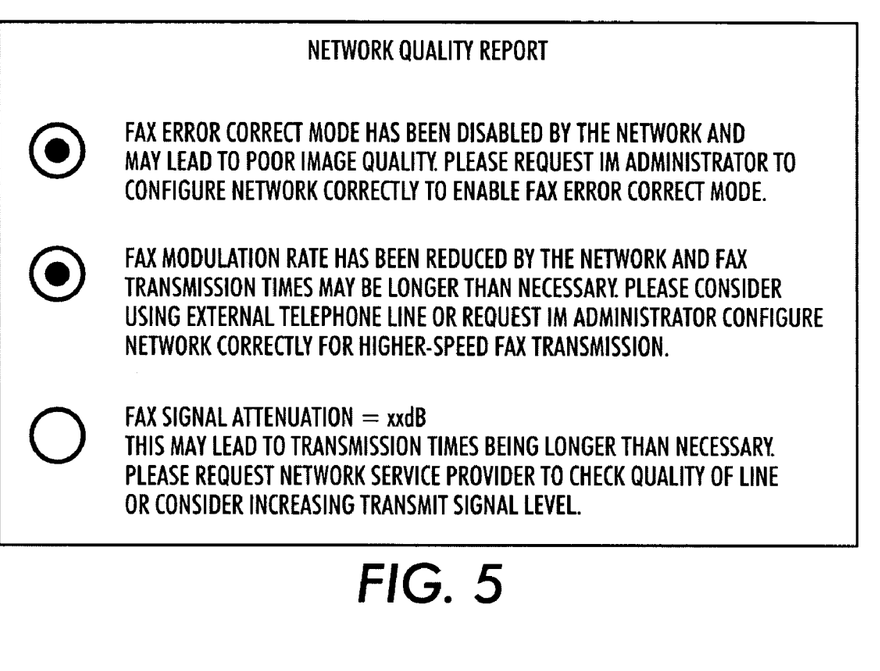
FIG. 5 is a screen shot of a communication network diagnostic report, in accordance with an embodiment.

As noted above, the diagnostic report may be delivered or obtained by printing the report to an output device (such as the sending fax device 106) or delivered to a user interface UI. The user interface UI is designed to provide access for activating the analysis of the network connection 122 between sending fax device 106 and receiving fax device 102. The user interface UI may be activated directly by a user or through a systems administrator. In the case of an administrator, when the user believes there is a problem with sending fax device 106, the user calls a support help desk. The diagnostic report feature is enabled from a user interface menu in a "Systems Administrator" mode. The administrator at the support help desk then instructs the user to run a network diagnostic report feature for the sending fax device 106. FIG. 5 is a screen shot of a diagnostic report, in accordance with an embodiment. The diagnostic report may be for a fax that is being transmitted over an IP network wherein the IP terminal adapter 110 is optimized for voice compression but not fax transmission. The report shown identifies two problems with the network—first, that ECM has been disabled, and second, that the fax modem modulation rate has been reduced by the network.

Determining the problem(s) of the communication network 100 can provide valuable information about the communication network's configuration. Additionally, identifying solutions to the problems allows for correction of the network connection such that a fax may be transmitted. Providing such information to a user or system administrator provides hard data allowing the fault to be localized to the network and enables network service personnel to rectify the fault. The report in FIG. 5 also identifies and provides suggestions for the identified problems. For example, when ECM is disabled, it instructs a user to ask the administrator to correctly configure the network. When the fax modulation rate is reduced, it suggests using an external telephone line (e.g., a standard PSTN) or asking the administrator to configure the network.

A similar process may also be used to generate a diagnostic report on receiving fax device 102. This would use the Non Standard facilities Setup (NSS) signal of the FIF of the sending fax device 106 to return the DIS FIF of receiving fax device 102 to determine if the sending fax device is compatible with the receiving fax. The sending fax device 106 would then return the DIS of the receiving fax device as passed by the network, and then transmit the signal level of sending fax device 106. It would enable any unbalanced signal attenuation between device 102 to device 106, or device 106 to device 102 to be determined.

In an alternative embodiment, the sending fax device may communicate using an analog network and the receiving fax device may communicate using a digital network.

It should be noted that the type of networks in communication network 100 should not be limited, and may also include mobile networks (e.g., GSM), satellite links, ISDN, ATM, frame relay, PSTN, and IP networks with IP Gateways or terminal adaptors, for example.

While the principles of the application have been made clear in the illustrative embodiments set forth above, it will be apparent to those skilled in the art that various modifications may be made to the structure, arrangement, proportion, elements, materials, and components used in the practice of the described application.

It will thus be seen that the objects of this application have been fully and effectively accomplished. It will be realized, however, that the foregoing preferred specific embodiments have been shown and described for the purpose of illustrating the functional and structural principles of this application and are subject to change without departure from such principles. Therefore, this application includes all modifications encompassed within the spirit and scope of the following claims.

What is claimed is:

1. A method of analyzing a quality of a communication network for facsimile devices, the communication network comprising at least a first facsimile device communicating through a digital network and a second facsimile device communicating through an analog network, the method comprising:

establishing a connection between the facsimile devices using the communication network;

assessing a configuration of the connection between the facsimile devices, the assessing comprising comparing bits of a facsimile information field (FIF) of a digital identification signal (DIS) from the second facsimile device to corresponding bits of a facsimile information field (FIF) of a non-standard facilities (NSF) signal from the second facsimile device to identify any changes made to the bits of the FIF of the DIS signal by communicating through the communication network;

identifying at least one problem in the connection between the facsimile devices, and generating a network diagnostic report of the at least one identified problem.

2. A method according to claim 1, further comprising delivering the network diagnostic report.

3. A method according to claim 1, wherein the network diagnostic report is delivered to a user interface.

4. A method according to claim 1, further comprising: identifying one or more improvements or solutions for correcting the at least one problem identified in the network connection.

5. A method according to claim 1, wherein identified problems comprise one or more of the following: disabling error correct mode, "noise" on the network, reducing facsimile modulation data rate due to voice codec compression, reduced signal attenuation due to the presence of DSL microfilters, or a poor terminal connection.

6. A method according to claim 4, wherein the improvements include increasing the signal level of the facsimile, increasing the gain of the network, enabling error correct mode, switching to an analog network, or configuring the network.

7. A system for analyzing and diagnosing a communication network connection for facsimile transmission, comprising:
a first facsimile device for sending facsimile information;
a second facsimile device for receiving the facsimile information from the first facsimile device;
the first facsimile device and second facsimile device connected through a communication network such that the first and second facsimile devices communicate with each other to send and receive the facsimile information, and
wherein the first facsimile device receives information to identify one or more problems within the communication network to generate a network diagnostic report of the at least one identified problems in the communication network, and
wherein the first facsimile device assesses a configuration of the network by comparing bits of a facsimile information field (FIF) of a digital identification signal (DIS) of the second facsimile device to corresponding bits of a facsimile information field (FIF) of a non-standard facilities (NSF) signal from the second facsimile device, and identifies changes made to the bits of the FIF of the DIS signal by the communication network.

8. A system according to claim 7, further comprising a user interface for activating analysis of the configuration of the communication network.

9. A system according to claim 8, wherein the user interlace further comprises a display of the network diagnostic report delivered to the user interface.

10. A system according to claim 7, wherein the network diagnostic report further includes improvements for correcting the at least one identified problems.

11. A system according to claim 7, wherein identified problems comprise one or more of the following: disabling error correct mode, "noise" on the network, reducing facsimile modulation data rate due to voice codec compression, reduced signal attenuation due to the presence of DSL microfilters, or a poor terminal connection.

12. A system according to claim 10, wherein the improvements include increasing the signal level of the facsimile, increasing the gain of the network, enabling error correct mode, switching to an analog network, or configuring the network.

13. A system according to claim 7, wherein the communication network comprises analog and digital networks for sending and receiving facsimile information.

14. A system according to claim 7, wherein the first facsimile device communicates through a digital network.

15. A system according to claim 7, wherein the second facsimile device communicates through an analog network.

16. A method of analyzing a quality of a communication network for facsimile devices, the communication network comprising at least a first facsimile device communicating through a digital network and a second facsimile device communicating through an analog network, the method comprising:
the second facsimile device sending bits of a facsimile information field (FIF) of a non-standard facilities (NSF) signal to the first facsimile device;
the first facsimile device determining if all of the bits are equal to zero, and
if all bits are equal to zero, then
identifying a disability to analyze the quality of the communication network, and
generating a network diagnostic report of the disability;
otherwise,
assessing a configuration of the connection between the facsimile devices;
identifying at least one problem in the connection between the facsimile devices, and
generating a network diagnostic report of the at least one identified problem.

17. A method according to claim 16, wherein assessing the configuration of the network comprises comparing bits of the facsimile information field (FIF) of the digital identification signal (DIS) from the second facsimile device to corresponding bits of the facsimile information field (FIF) of the non-standard facilities (NSF) signal from the second facsimile device to identify any changes made to the bits of the FIF of the DIS signal by communicating through the communication network.

18. A method according to claim 16, further comprising delivering the network diagnostic report, the diagnostic report identify at least one improvement for correcting the at least one identified problems.

* * * * *